D. C. LARSON.
BRAKE.
APPLICATION FILED OCT. 15, 1917.

1,317,798.

Patented Oct. 7, 1919.

Inventor
David C. Larson
By his Attorney
L. N. Campbell

UNITED STATES PATENT OFFICE.

DAVID C. LARSON, OF YONKERS, NEW YORK, ASSIGNOR TO OTIS ELEVATOR COMPANY, OF JERSEY CITY, NEW JERSEY, A CORPORATION OF NEW JERSEY.

BRAKE.

1,317,798.  Specification of Letters Patent.  Patented Oct. 7, 1919.

Application filed October 15, 1917. Serial No. 196,604.

*To all whom it may concern:*

Be it known that I, DAVID C. LARSON, a citizen of the United States, residing in Yonkers, in the county of Westchester and State of New York, have invented a new and useful Improvement in Brakes, of which the following is a specification.

My invention relates to brake controlling devices, and is a means for controlling the operations of the brake applying and releasing mechanisms in a brake apparatus as, for instance, an electromagnetic brake, used in an elevator system.

An object of my invention is the provision of means to effect a smooth and gradual application of braking force, such means being automatic in operation, manually adjustable for varying conditions, and self-adapting to conditions arising from wear on the braking members.

A further object is the provision of means for obtaining an adjustable minimum and adjustable maximum braking action, with means for regulating the time occupied in passing from minimum to maximum pressure, and means to effect a quick application of the minimum pressure when the brake applying apparatus is brought into operation.

A further object is the provision of means for retarding the action of the brake releasing mechanism in an electromagnetic brake, to prevent a too sudden movement and slamming together of the electromagnet cores. Other objects of my invention will appear hereinafter. It will be seen that the scope of my invention is general, since it is applicable to any braking apparatus in which brake members are moved into and out of frictional contact with one another. This invention will be of especial value when applied to electromagnetic brakes operated by alternating current, since the present means for cushioning the action of a brake, by regulating the flow of current, used with some success in direct current brakes, is not applicable to alternating current types.

Figure 1:
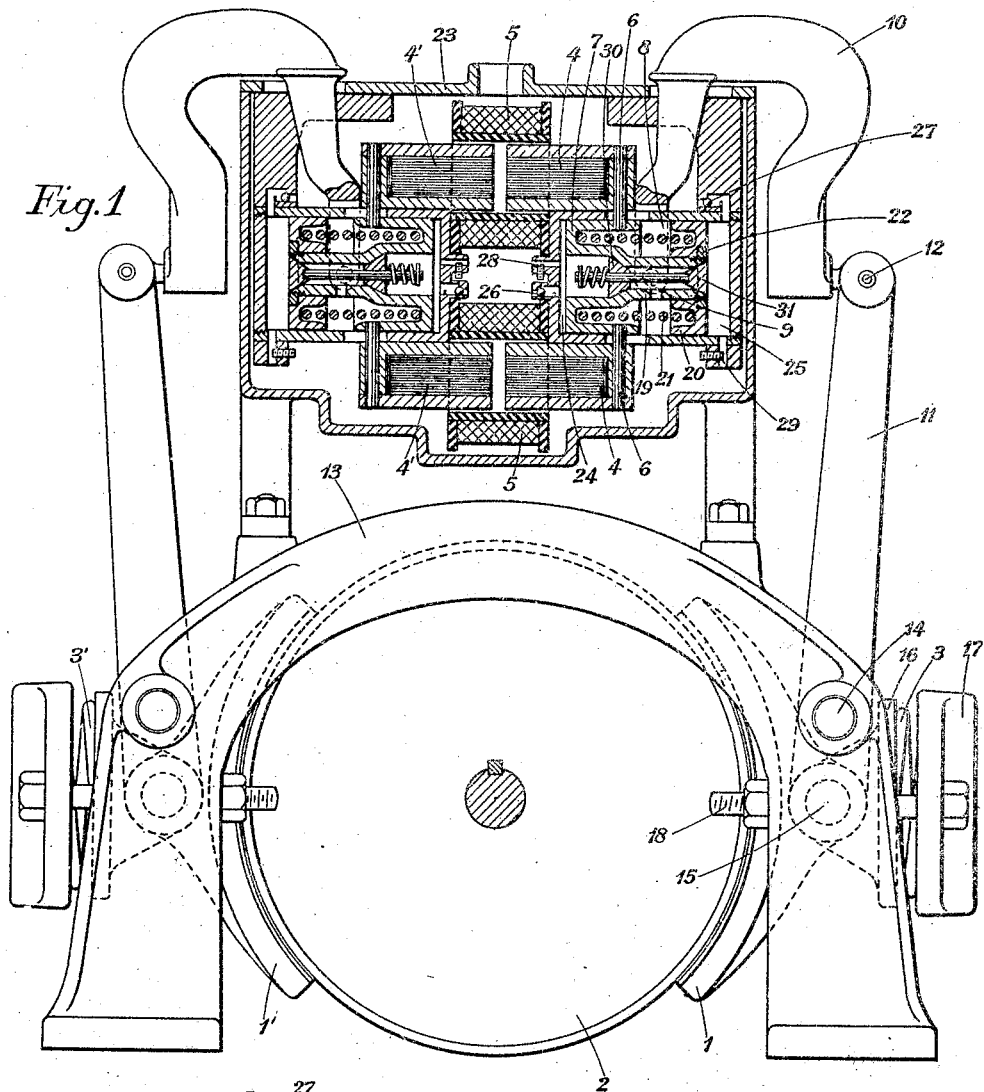
Figure 2:
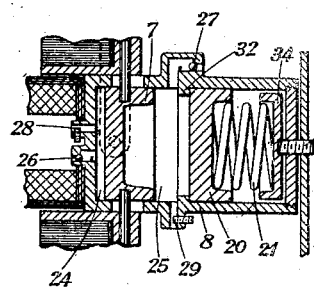

In the accompanying drawing, Figure 1 is a sectional elevation of my invention embodied in a brake apparatus of well-known type, in which brake shoes 1, 1', normally applied to a friction pulley 2 by means of compression springs 3, 3', are released by the moving together of cores 4, 4' of electromagnets 5. Fig. 2 is a sectional elevation of a modification in the construction and arrangement of the essential parts in my invention. Like numerals refer to corresponding parts in both figures.

In Fig. 1 the apparatus on either side of the electromagnets is identical in construction and operation. The following description, referring to one side only, applies to both sides.

Cores 4 of electromagnets 5 are connected by pins 6 to piston 7, which piston works in cylinder 8. Pin 9 connects piston 7 with movable arm 10 which in turn is pivoted to lever 11 at connection 12. Lever 11 is pivoted to a rigid frame 13, at connection 14, and carries at its other end, through pivotal connection 15, the brake shoe 1, and member 16, through which member spring pressure is transmitted to the brake shoe. Compression spring 3 acts between member 16 and abutment 17, which abutment is adjustably secured to the frame 13 by means of bolts 18, whose adjustment determines the compression of the spring.

Fitted around the projection 19 of piston 7, and adapted to work longitudinally thereon, and in the cylinder 8, is piston 20, which piston is normally held by the action of compression spring 21 in engagement with nut 22, which nut is screw-threaded to the outer extremity of projection 19. By turning nut 22 the distance between piston 20 and the head of piston 7 may be increased or decreased, thus regulating the compression of spring 21. By compressing spring 21, piston 20 may be made to move along the projection 19, and so approach the head of piston 7.

The cylinder 8 and electromagnets 5 with their cores 4 are inclosed in a casing 23, mounted on the frame 13, and filled with oil or other fluid, which is free to circulate to all parts of the mechanism, including the space between pistons 7 and 20, with the exception of the cushion chambers 24 and 25 at the ends of cylinder 8.

The cushion chambers are isolated by the pistons, and fluid is admitted to them through check valves 26 and 27, which valves permit fluid to flow unrestricted into, but not out of the chambers. The fluid thus admitted may be ejected by movement of the pistons, only through adjustable throttle valves 28 and 29, the setting of which, by regulating the rate of ejection of fluid, determines the timing of the movement of the respective pistons.

Auxiliary check valves 30, 31, operate to admit fluid to the cushion chambers in the event of failure of check valves 26, 27, to function, so guarding against the creation of vacuums in the cushion chambers which might otherwise prevent the operation of the braking mechanism.

It will be seen that by the operation of the valves described, the cushion chambers will at all times be entirely occupied by fluid.

It is to be understood that each pair of valves, 26, 28 and 27, 29, may be combined into one valve so constructed as to permit unrestricted inflow, and adjustably restricted outflow of fluid.

Check valves 26, 27, here shown as ball operated, and auxiliary check valves 30, 31, here shown as spring pressed, may be of any desired number and construction, and may be situated either in the pistons or in the cylinder walls, since the function of all the said valves is to insure an unrestricted supply of fluid to the cushion chambers.

In Fig. 2, I have shown a modification in the construction and arrangement of parts, in which pistons 7 and 20 work in cylinder 8. As in Fig. 1, piston 7 is connected with the brake applying and releasing apparatus. Piston 20 is held by spring 21, seated against a shoulder 32, and the pressure of the spring may be varied by manipulating set screw 33 against a collar 34. Cushion chambers 24 and 25 are situated on opposite sides of piston 7, and the flow of fluid in the respective cushion chambers is regulated by check valves 26, 27, and adjustable throttle valves 28, 29.

By the automatic operation of the parts described, I obtain first a retarded operation of the electromagnet cores and parts connected therewith, and second, through an initial application of minimum braking pressure, and a gradual building up to maximum braking pressure, a smooth and gradual stopping of the friction pulley and apparatus connected therewith, according to the following cycle of operation, reference being made to Fig. 1.

The accompanying drawing shows the apparatus at the completion of the brake applying operation, with electromagnets deenergized and maximum braking force applied. Now, when electromagnets 5 are energized, cores 4 are drawn inward carrying with them piston 7 in cylinder 8, and releasing the brake shoe from contact with the friction pulley. Piston 20 being in engagement with nut 22 moves along with piston 7. The fluid in cushion chamber 24 is ejected through valve 28, and by retarding the movement of piston 7 causes a smooth operation of the electromagnet cores and the movable parts connected therewith, preventing their too sudden movement and slamming, which would otherwise occur with destructive effect, especially in the case of alternating current electromagnets.

In the above operation fluid is admitted to cushion chamber 25 through check valve 27, as the volume of the chamber increases.

Now to apply the braking force the electromagnets are deënergized, and compression spring 3 acts on the brake shoe, bringing it immediately but with minimum pressure into contact with the friction pulley. The greater part of the force of spring 3 is expended in moving through member 16, lever 11, and arm 10, the piston 7 away from its seat, due to the resistance encountered in compression spring 21, acting between pistons 7 and 20. As piston 7 is so moved, nuts 22 pass out of engagement with piston 20, which piston is moved toward the head of piston 7, due to the displacement of fluid in chamber 25 by the entrance of projection 19 and nut 22 thereinto, and spring 21 is compressed. The force of compressed spring 21, now acting against piston 20, causes the said piston to resume its original position with regard to piston 7, which it accomplishes by ejecting fluid from chamber 25 through throttle valve 29.

As piston 20 is so moved the compression of spring 21 decreases, with a resultant gradual increase of pressure from spring 3 on the brake shoe, until piston 20 reaches its limit of travel by being brought up against nut 22, at which time no further resistance is offered to the action of spring 3, which now exerts its full maximum pressure on the brake shoe.

In the above operation fluid is admitted to cushion chamber 24 through check valve 26, as the volume of the chamber increases.

In the modified apparatus shown in Fig. 2, the brake releasing operation is identical with that described for Fig. 1 except that piston 20 remains stationary initially. In the brake applying operation the movement of piston 7, by displacing the fluid in cushion chamber 25 moves piston 20 away from its seat against the compression of spring 21. The spring now returns piston 20 to its seat by expelling fluid through throttle valve 29. The cushioning effect on the brake application is identical with that described for Fig. 1.

It will be seen that with wear on the brake shoes and friction pulley, and a resultant increase in airgap between those members, the apparatus will adapt itself to the changed condition, the brake application becoming slightly more gradual, due to the increased distance through which the pistons are made to travel.

The timing of the application of braking force from minimum to maximum can be varied at will according to operating requirements, or wear by adjusting throttle valve 29. Thus any desired rapidity of braking can be obtained without regard to the exact setting of the brake shoes.

The initial minimum braking force can be determined through varying, by manual adjustment, the ratio of forces exerted by compression springs 3 and 20, while the maximum braking force can be determined by adjusting the compression of spring 3 alone.

Obviously those skilled in the art may make various changes in the details, arrangements and number of parts, without departing from the spirit and scope of my invention, and I desire therefore not to be limited to the exact construction herein described.

I claim:—

1. In combination braking members, springs to bring the same into frictional contact, means to release the braking members, and means comprising a spring and dash pot separate from the first mentioned springs and the releasing means to effect a gradual operation of the springs.

2. In combination a brake, brake applying means, cylinders, and pistons movable therein and springs applied to the pistons to oppose their movement in the application of the brake to control the brake applying means for a gradual operation.

3. In combination, a brake, brake applying means, cylinders, and a plurality of pistons movable in each cylinder to control the brake applying means for a gradual operation.

4. In combination, a brake, brake applying means, cylinders, pistons movable therein to control the brake applying means for a gradual operation, and a fluid to control the operation of the pistons.

5. In combination, a brake, brake applying means, cylinders, pistons movable therein to control the brake applying means for a gradual operation, a fluid to control the movement of the pistons, a fluid reservoir, and fluid passages between the cylinders and the reservoir.

6. In combination, a brake, brake applying means, cylinders, pistons movable therein to control the brake applying means for a gradual operation, a fluid to control the movement of the pistons, a fluid reservoir, fluid passages between the cylinders and the reservoir, and valves in the passages to control the flow of fluid between the cylinders and the reservoir.

7. In combination, a brake, brake applying means, cylinders, pistons movable therein to control the brake applying means for a gradual operation, a fluid to control the movement of the pistons, a fluid reservoir, fluid passages between the cylinders and the reservoir, check valves in some of the passages to allow only a flow of fluid from the reservoir into the cylinders, throttle valves in the remaining passages to restrict the flow of fluid from the cylinders into the reservoir, and throttling plugs to adjust the throttle valves.

8. In combination, a brake, brake applying means, cylinders, pistons movable therein, connections between the pistons and the brake applying means, additional pistons movable in the cylinders, and means to control the operation of the pistons.

9. In combination a brake, brake applying means, cylinders, pistons movable therein, connections between the pistons and the brake applying means, additional pistons movable in the cylinders, seats for the said pistons, and means to control the operation of the pistons.

10. In combination, a brake, brake applying means, cylinders, pistons movable therein, connections between the pistons and the brake applying means, additional pistons movable in the cylinders, seats for the said pistons, means to constrain the said pistons in their seats, and means to control the operation of the pistons.

11. In combination, a brake, brake applying means, cylinders, pistons movable therein, connections between the pistons and the brake applying means, additional pistons movable in the cylinders, seats for the said pistons, means to constrain the said pistons in their seats, means to adjust the constraining members, and means to control the operation of the pistons.

12. In combination a brake, brake releasing means, a fluid reservoir, a fluid, cylinders distinct from the fluid reservoir, fluid passages connecting the cylinders with the fluid reservoir, pistons in the cylinders regulated by a circulation of the fluid and movable to control the brake releasing means for a retarded operation.

13. In combination a brake, brake applying and releasing means, means to control the brake applying means for a gradual operation, and means to control the brake releasing means for a retarded operation.

14. In combination a brake, brake applying and releasing means, cylinders, pistons movable therein to control the brake applying means for a gradual operation and to control the brake releasing means for a retarded operation, and means to control the movement of the pistons.

In testimony whereof, I have signed my name to this specification in the presence of two subscribing witnesses.

DAVID C. LARSON.

Witnesses:
 M. E. DUFF,
 JOHN G. PROBE.